United States Patent
Andeweg et al.

(10) Patent No.: US 12,004,525 B2
(45) Date of Patent: Jun. 11, 2024

(54) DEBONER FOR POULTRY PARTS

(71) Applicant: Meyn Food Processing Technology B.V., Oostzaan (NL)

(72) Inventors: Peter Martin Andeweg, Oostzaan (NL); Dirk Hermen Van der Waal, Oostzaan (NL)

(73) Assignee: Meyn Food Processing Technology B.V., Oostzaan (NL)

( * ) Notice: Subject to any disclaimer, the term of this patent is extended or adjusted under 35 U.S.C. 154(b) by 0 days.

(21) Appl. No.: 17/720,509

(22) Filed: Apr. 14, 2022

(65) Prior Publication Data

US 2022/0330561 A1 Oct. 20, 2022

(30) Foreign Application Priority Data

Apr. 16, 2021 (NL) ....................................... 2027999

(51) Int. Cl.
*A22C 21/00* (2006.01)
(52) U.S. Cl.
CPC ...... *A22C 21/0076* (2013.01); *A22C 21/0053* (2013.01)
(58) Field of Classification Search
CPC ............ A22C 21/0076; A22C 21/0053; A22C 21/0069
USPC .................................................. 452/135, 136
See application file for complete search history.

(56) References Cited

U.S. PATENT DOCUMENTS

| | | | |
|---|---|---|---|
| 5,203,736 A | 4/1993 | Schulte et al. | |
| 5,401,210 A * | 3/1995 | Manmoto | A22C 21/0076 452/136 |
| 5,713,787 A * | 2/1998 | Schoenmakers | A22C 17/004 452/136 |
| 9,192,172 B2 * | 11/2015 | Van Der Steen | A22B 7/003 |
| 9,615,591 B1 | 4/2017 | Stooker | |
| 2015/0250193 A1 * | 9/2015 | Kido | A22C 21/0053 452/135 |

FOREIGN PATENT DOCUMENTS

| | | |
|---|---|---|
| CN | 108338093 A | 7/2018 |
| CN | 210709570 U | 6/2020 |
| EP | 0439784 A1 | 8/1991 |
| JP | H02-177849 A | 7/1990 |
| JP | H04-211323 A | 8/1992 |

(Continued)

OTHER PUBLICATIONS

Search Report for NL Patent Application No. 2027999 dated Dec. 3, 2021 (3 pages).

*Primary Examiner* — Richard T Price, Jr.
(74) *Attorney, Agent, or Firm* — Dority & Manning, P.A.

(57) ABSTRACT

A deboner for a poultry part equipped with a first jaw and a second jaw mounted on an up-and-down movable slide block supporting a first frame portion, a second frame portion, and a third frame portion. The first jaw and the second jaw are movable towards and away from each other, wherein the first jaw is through a first hinge connected with the first frame portion so as to enable a rotational movement of the first jaw with respect to the first frame portion. A second hinge pivotably connecting the first frame portion to the third frame portion and a third hinge pivotably connecting the second frame portion with the third frame portion share a common axis of rotation.

9 Claims, 6 Drawing Sheets

(56) References Cited

FOREIGN PATENT DOCUMENTS

| | | |
|---|---|---|
| JP | H05184281 A | 7/1993 |
| JP | 2013-144326 A | 7/2013 |
| WO | WO9309675 A1 | 5/1993 |
| WO | WO2011093698 A1 | 8/2011 |
| WO | WO2017131513 A1 | 8/2017 |
| WO | WO2020162757 A1 | 8/2020 |
| WO | WO 2020/187692 A1 | 9/2020 |

\* cited by examiner

DEBONER FOR POULTRY PARTS

PRIORITY STATEMENT

The present application claims priority under 35 U.S.C. § 119 to Dutch patent application No. 2027999, filed Apr. 16, 2022.

FIELD OF THE INVENTION

In general, the present subject matter relates to a deboner for a poultry part.

BACKGROUND OF THE INVENTION

A deboner apparatus is known from WO201 F093698. Other deboners are disclosed by U.S. Pat. No. 5,203,736; WO2017/131513 and WO93/09675. Another deboner is disclosed by U.S. Pat. No. 9,615,59 and is equipped with a first jaw and a second jaw that are mounted on an up-and-down movable frame including a first frame portion, a second frame portion, and a third frame portion, wherein the first frame portion is rotatably mounted on the third frame portion, and the second frame portion is rotatably mounted on the third frame portion, and wherein the first jaw and the second jaw are movable towards and away from each other between a nonoperative position and an operative position, wherein the first jaw is through a first hinge connected with the first frame portion so as to enable a rotational movement of the first jaw with respect to the first frame portion.

BRIEF DESCRIPTION OF THE INVENTION

In one exemplary aspect, it is an object of the invention to increase the yield of meat to be stripped from poultry bone in a reliable manner, i.e. to further reduce the adverse effect of variations in size of the poultry parts to the amount of meat that can be harvested therefrom. According to another exemplary aspect, a deboner is proposed that is provided with the features of one or more of the appended claims. The deboner can be suitably used for stripping meat of a poultry drum, thigh, or even a whole leg.

In an exemplary embodiment, the invention relates to a deboner for a poultry part, wherein the poultry part to be processed is suspended in a conveyor for moving the poultry part along the deboner to enable processing the poultry part by the deboner. The deboner can be equipped with a first jaw and a second jaw that are arranged to engage the poultry part and are movable towards and away from each other between a nonoperative position and an operative position. The jaws can be jointly movable up and down for assuming an initial altitude, respectively for processing the pouttry part from the initial altitude.

In an exemplary aspect, a deboner of the invention may have a second hinge pivotably connecting the first frame portion to the third frame portion and a third hinge pivotably connecting the second frame portion with the third frame portion and may share a common axis of rotation. The common axis of rotation of the first frame portion and the second frame portion can result in more accurate placement of the first jaw and the second jaw with respect to each other, which provides better stripping results with higher yield of meat.

In another exemplary aspect, the common axis of rotation may be in a vertical plane also including a carrier from which the poultry part is suspended. This can provides that the common axis of rotation and the carrier from which the poultry part is suspended are exactly vertically aligned with each other, and can avoid that the poultry part unnecessarily has to depart from its line of conveyance during processing. Also there can be only a minimal torque around the hinges as a result of the scraping forces acting on the poultry part, so opening of the jaws due to scraping forces only occurring over the second and third hinge for better stripping results.

Apart from having the first jaw connected through the first hinge with the first frame portion, the second jaw may be connected through a fourth hinge with the second frame portion so as to enable a rotational movement of both the first jaw and the second jaw with respect to the first frame portion and the second portion, respectively, so that both the first jaw and the second jaw can adjust to the dimension of the poultry part.

Suitably at least one of the first jaw and the second jaw may be spring-loaded so as to urge the concerning jaw in use towards the poultry part and enable that the jaw passes any knuckle present in the suspended poultry part.

Both the first jaw and the second jaw may be spring-loaded so as to urge both the first jaw and the second jaw in use towards the poultry part to be processed. Another effect is that since the jaws adjust to the dimension of the poultry part, the jaws can be enabled to pass a knuckle present at the end of the bone of the poultry part when the jaws are stripping down the meat.

Suitably the first frame portion can be connected to a first actuator for executing a rotational movement of the first frame portion with respect to the third frame portion. This brings the first jaw in operative position for the stripping operation. Likewise the second frame portion can be connected to a second actuator for executing a rotational movement of the second frame portion with respect to the third frame portion.

The invention is further embodied in a processing line that includes a conveyor with a series of carriers for suspending poultry parts, and at least one deboner according to one or more of the exemplary embodiments of the invention provided herein. The processing line may be provided with a carousel type device with plural deboners.

For using a carousel type device with plural deboners, each deboner may have the feature that the slide block is provided with a first guide wheel and the first actuator and/or the second actuator are connected to another slide block provided with a second guide wheel, wherein both guide wheels are equipped to cooperate with guide tracks provided at a carousel-drum's circumference such that the slide block's altitude is determined by the guide tracks of the carousel-drum.

BRIEF DESCRIPTION OF THE DRAWINGS

The invention will hereinafter be further elucidated with reference to drawings of an exemplar embodiment of a deboner of the invention that is not limiting as to the appended claims.

In the drawings.

Whenever in the figures the same reference numerals are applied, these numerals refer to the same parts.

DETAILED DESCRIPTION OF THE INVENTION

Figure 1:
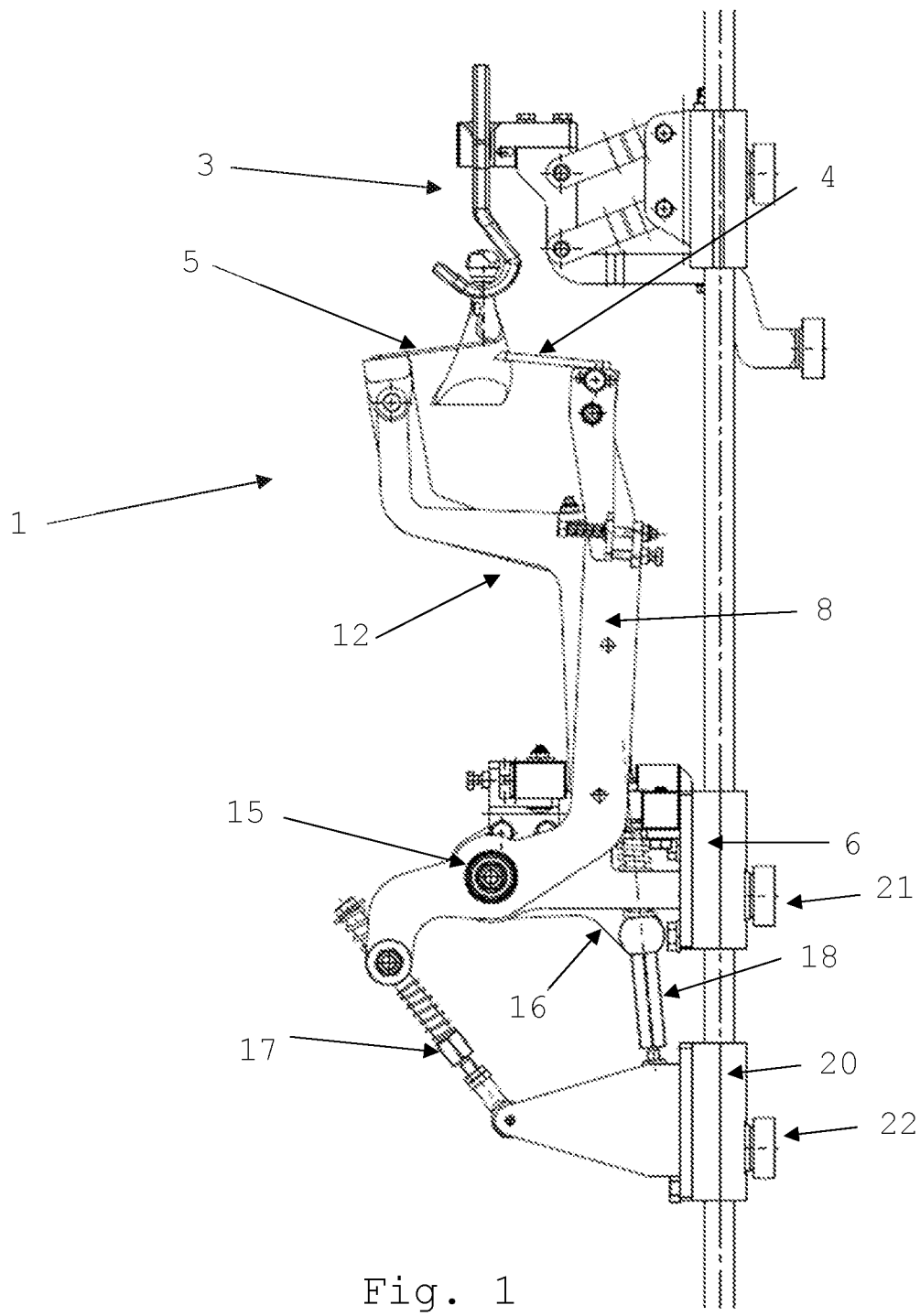
FIGS. 1, 2, and 3 show a single deboner according to an exemplary embodiment the invention in a side view in three subsequent stages.
Figure 2:
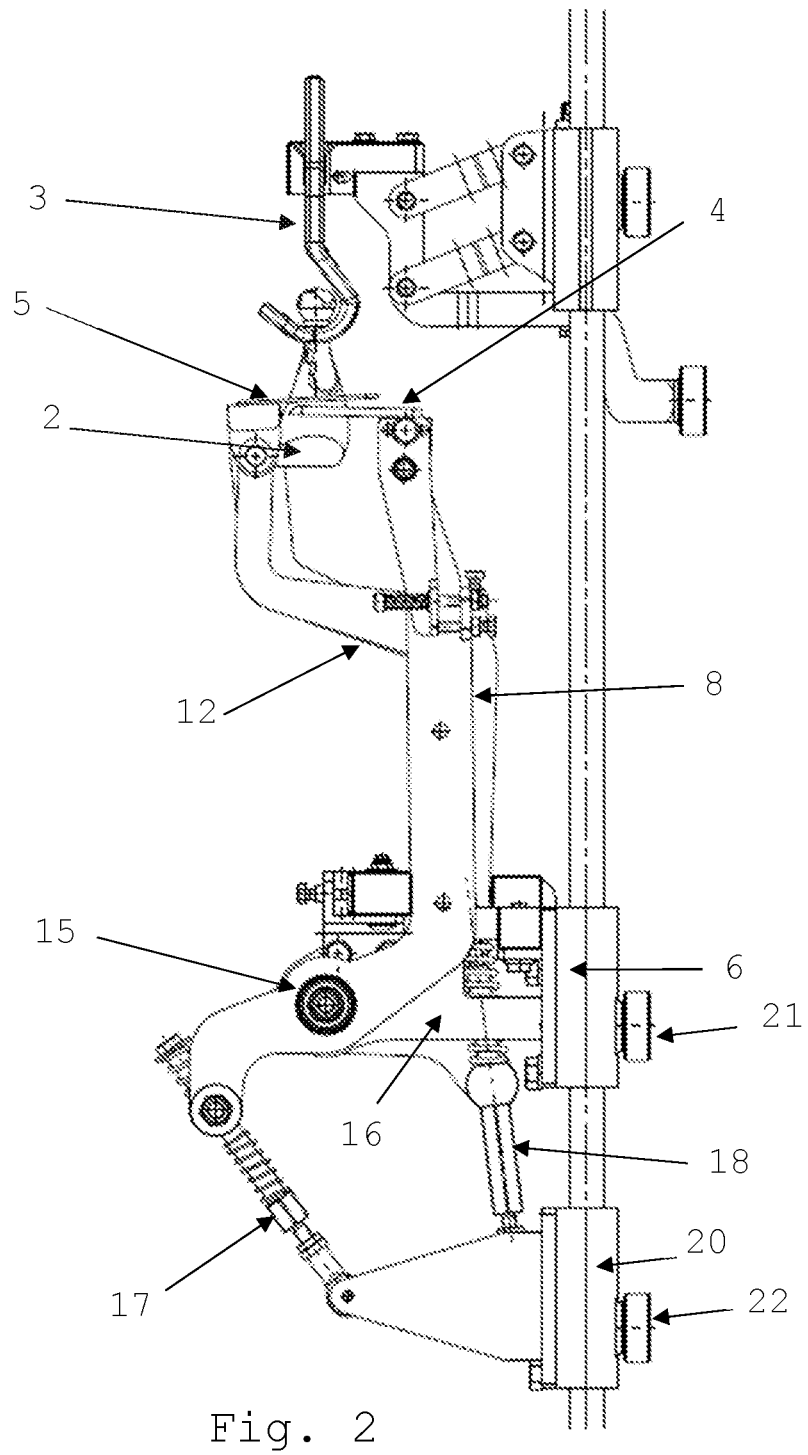
Figure 3:
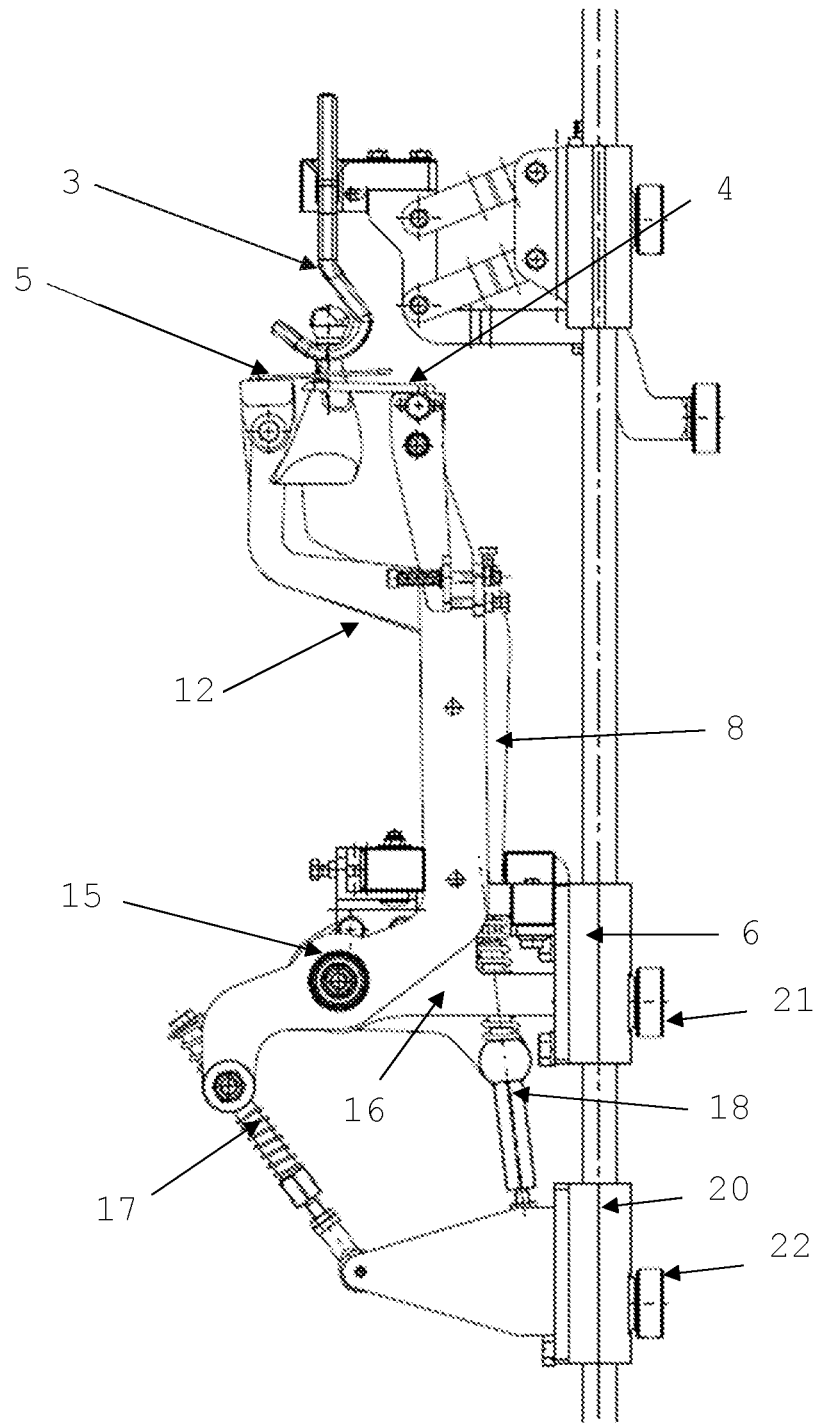

In FIGS. 1-3, an exemplary deboner 1 for a poultry part 2 is shown, wherein the poultry part 2 is suspended in a conveyor that has a series of carriers. FIGS. 1-3 show for clarity only a single carrier 3 and a single poultry part 2 suspended therefrom. The conveyor with the carrier(s) 3 move poultry part(s) along the deboner 1 so as to enable processing of the poultry part(s) 2 by the exemplary deboner 1.

Exemplary deboner 1 is equipped with a first jaw 4 and a second jaw 5 that are (eventually) mounted on a slide block 6. The slide block supports a first frame portion 8, a second frame portion 12 and a third frame portion 16, as will be discussed further hereinafter. The jaws 4, 5 are movable towards and away from each other between a nonoperative position (FIG. 1) and an operative position (FIG. 3) in which the jaws 4, 5 engage the poultry part 2 that is being processed. FIG, represents an intermediate position between the nonoperative position of FIG. 1 and the operative position of FIG. 3.

FIGS. 1-3 show that the first frame portion 8 is rotatably mounted through a second hinge 15 on the third frame portion 16. Like the first frame portion 8 and the second frame portion 12, the third frame portion 16 is supported by slide block 6 which is up-and-down movable. The jaws 4, 5 are thus arranged to be jointly movable up and down for assuming an initial altitude which is shown in FIG. 3. After this initial altitude as shown in FIG. 3 has been assumed, the jaws 4, 5 can be moved down for processing, that is stripping the meat from the poultry part starting at the initial altitude. This is all clear for the skilled person and requires no further elucidation.

Figure 4:
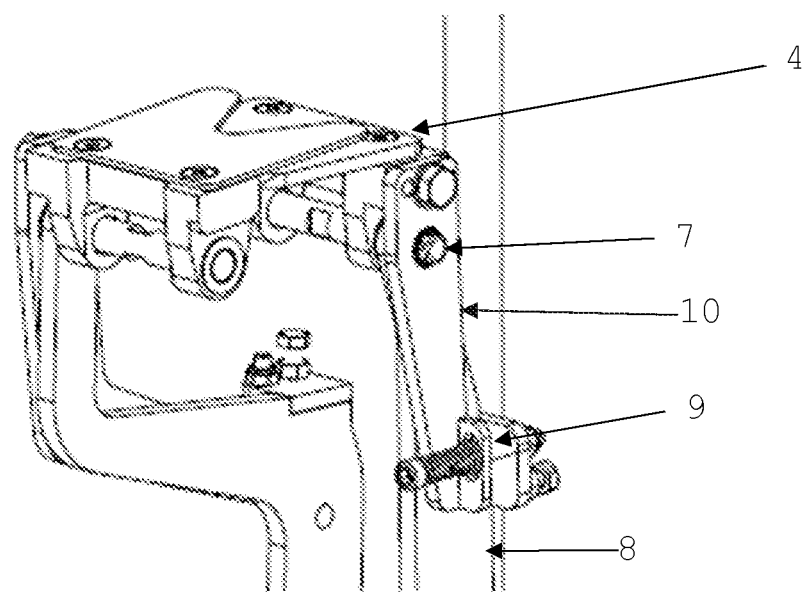
FIG. 4 provides a detailed view at an exemplary first jaw.
Figure 5:
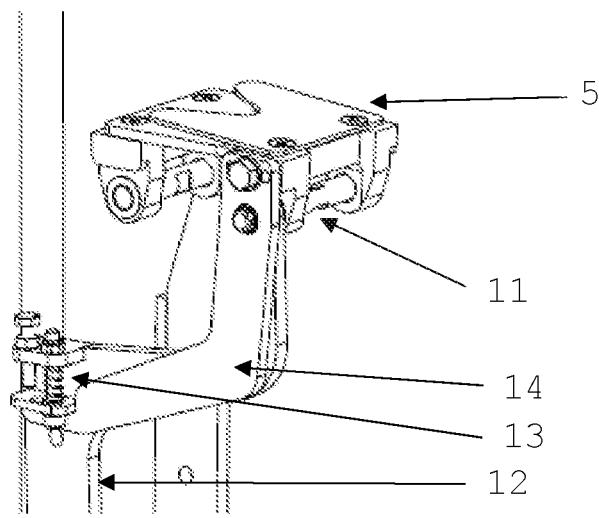
FIG. 5 provides a detailed view at an exemplary second jaw.
Figure 6:
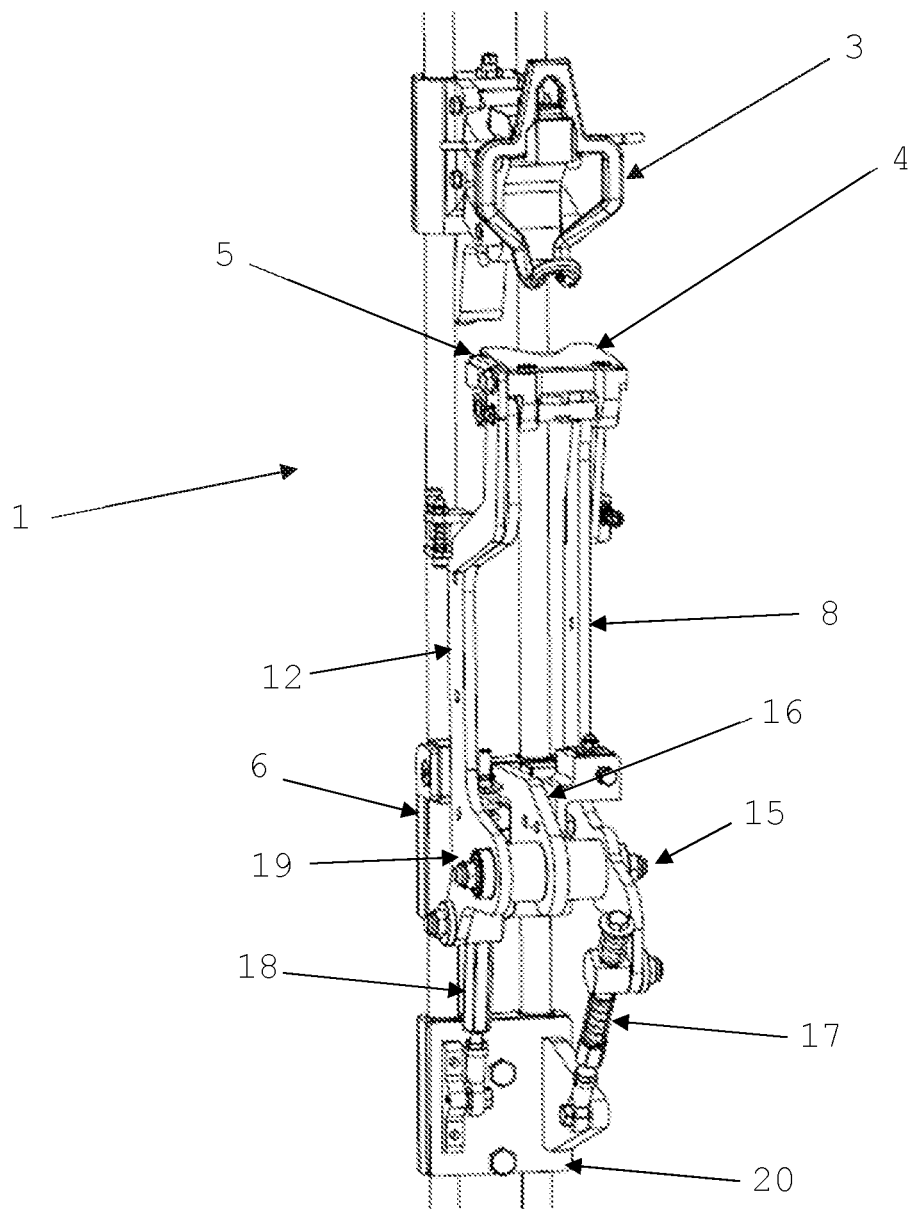
FIG. 6 provides an exemplary isometric view at the deboner.

In FIGS. 4-6, specific features are shown that contribute to the effectiveness and high yield of the exemplary deboner 1 of the invention.

FIG. 4 illustrates that the first jaw 4 is through a first hinge 7 eventually supported by the first frame portion 8 so as to enable a rotational movement of the first jaw 4 with respect to the first frame portion 8. Accordingly, the first jaw 4 can adjust to a dimension of the poultry part to be processed. This includes adjustment to any knuckle present in the poultry-part. The first jaw 4 is preferably spring-loaded with a spring 9 that engages a lever arm 10 of the first jaw 4 so as to urge the first jaw 4 in use towards the poultry part, FIG. 5 shows that also the second jaw 5 is connected through a fourth hinge 11 with the second frame portion 12 so as to enable a rotational movement of not only the first jaw 4, but also the second jaw 5, the latter with respect to the second frame portion 12. In this manner both the first jaw 4 and the second jaw 5 can adjust to the dimension of the poultry part or to the knuckles present therein. FIG. 5 further shows the preferable feature that also the second jaw 5 is spring-loaded with a spring 13 engaging a lever arm 14 of the second jaw 5, so as to urge the second jaw 5 in use towards the poultry part to be processed.

FIG. 6 further shows that the first frame portion 8 is connected to a first actuator 17 for executing a rotational movement of the first frame portion 8 with respect to the third frame portion 16. Likewise the second frame portion 12 is rotatably mounted through a third hinge 19 with the third frame portion 16, wherein further the second frame portion 12 is connected to a second actuator 18 for executing a rotational movement of the second frame portion 12 with respect to the third frame portion 16.

In another exemplary aspect, to support the operation of plural deboners of the invention in combination with a carousel type device, it is further shown that in each deboner, the slide block 6 is provided with a first guide wheel 21 and the first actuator 17 and the second actuator 18 are connected to another slide block 20 provided with a second guide wheel 21, wherein both guide wheels 21, 22 are equipped to cooperate with guide tracks (not shown but extensively known to the skilled person) provided at a carousel-drum's circumference such that the slide blocks' 6, 20 altitude is determined by the guide tracks of the drum.

Finally, it is shown that the second hinge 15 of the first frame portion 8 and the third hinge 19 of the second frame portion 12 share a common axis of rotation.

Although the invention has been discussed in the foregoing with reference to an exemplary embodiment of the deboner of the invention, the invention is not restricted to this particular embodiment which can be varied in many ways without departing from the invention. The discussed exemplary embodiment shall therefore not be used to construe the appended claims strictly in accordance therewith. On the contrary the embodiment is merely intended to explain the wording of the appended claims without intent to limit the claims to this exemplary embodiment. The scope of protection of the invention shall therefore be construed in accordance with the appended claims only, wherein a possible ambiguity in the wording of the claims shall be resolved using this exemplary embodiment.

The invention claimed is:

1. A deboner for a poultry part, wherein the poultry part to be processed is suspended in a conveyor for moving the poultry part along the deboner to enable processing the poultry part by the deboner, the deboner comprising,
   a first jaw and a second jaw that are arranged to engage the poultry part;
   an up-and-down movable slide block supporting a first frame portion, a second frame portion, and a third frame portion, wherein the first jaw and second jaw are mounted on the slide block, wherein the first frame portion is rotatably mounted on the third frame portion, and the second frame portion is rotatably mounted on the third frame portion, and wherein the first jaw and the second jaw are movable towards and away from each other;
   a first hinge connecting the first jaw and first frame portion so as to enable a rotational movement of the first jaw with respect to the first frame portion;
   a second hinge that pivotably connects the first frame portion to the third frame portion; and
   a third hinge that pivotably connects the second frame portion with the third frame portion, wherein the second hinge and third hinge share a common axis of rotation.

2. The deboner of claim 1, wherein the conveyor includes a series of carriers for suspending the poultry part, and wherein the common axis of rotation and one of the carriers from which the poultry part is suspended are exactly vertically aligned with each other.

3. The deboner of claim 1, further comprising a fourth hinge connecting the second jaw with the second frame portion so as to enable a rotational movement of the second jaw with respect to the second portion so that both the first jaw and the second jaw can adjust to a dimension of the poultry part.

4. The deboner of claim 1, wherein at least one of the first jaw and the second jaw is spring-loaded so as to urge the concerning jaw in use towards the poultry part and enable that such jaw passes any knuckle present in the suspended poultry part.

5. The deboner of claim 1, wherein the first jaw and the second jaw are both individually spring-loaded so as to individually urge both the first jaw and the second jaw in use towards the poultry part and enable such jaws to pass any knuckle present in the suspended poultry part.

6. The deboner of claim 1, where the first frame portion is connected to a first actuator for executing a rotational movement of the first frame portion with respect to the third frame portion.

7. The deboner according to claim 6, wherein the second frame portion is connected to a second actuator for executing a rotational movement of the second frame portion with respect to the third frame portion.

8. The deboner according to claim 1, wherein the slide block is provided with a first guide wheel, wherein the first actuator, the second actuator, or both, are connected to another slide block provided with a second guide wheel, both guide wheels being equipped to cooperate with guide tracks provided at a carousel-drum's circumference such that the slide blocks' altitude is determined by the guide tracks of the carousel-drum.

9. A processing line, comprising:
   a conveyor with carriers for suspending poultry parts; and
   a deboner according to claim 1.

* * * * *